United States Patent Office 3,547,884
Patented Dec. 15, 1970

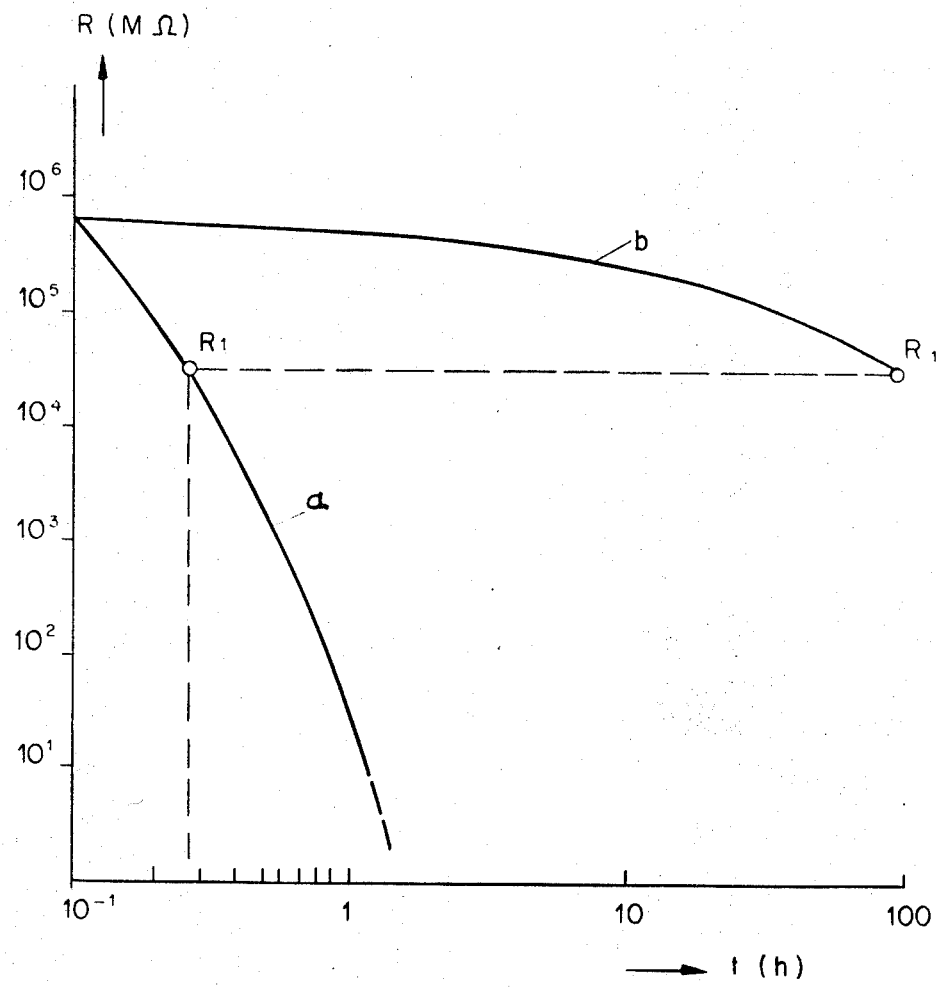

3,547,884
PROCESS FOR PREPARING CURABLE EPOXY
RESIN AND INSULATIONS OF ELECTRICAL
EQUIPMENT MADE THEREWITH
Werner Moller, Dubendorf, Switzerland, assignor to
Maschinenfabrik Oerlikon, Zurich, Switzerland
Filed Feb. 1, 1968, Ser. No. 702,479
Claims priority, application Switzerland, Feb. 7, 1967,
1,903/67
Int. Cl. C08g 30/04
U.S. Cl. 260—47                                4 Claims

ABSTRACT OF THE DISCLOSURE

Epoxy resin suitable for the insulation of electrical equipment and dried, wound glass fiber reinforced mica fleece strips and foils. The resin essentially consists of anhydrous bisphenol-A-diglycidyl ether of an epoxy equivalent weight between about 150–500, 0.015–0.15 part by weight of alkali metal in the form of alcoholate and 0.25–5 parts by weight of epoxy alkyl silane ester being incorporated into the resin. Then novel resin system is prepared by subjecting a mixture of the three substances to a degassing operation for at least one hour at temperatures between 40–70° C. and at pressures between 0.5–10 mm. Hg.

SUMMARY OF THE INVENTION

This invention generally relates to curable epoxy resins and is particularly directed to a procedure for accelerating the curing of epoxy resins and for improving the bonding characteristics of the resins to glass fibers and minerals, thereby to increase the resistance to water of the bonded objects.

As is generally known, epoxy resins are substances containing more than two ethylene oxide rings. The industrially most important epoxy resin type is formed by the condensation of epichlorohydrin with bis-(4-hydroxyphenyl)-dimethyl-methane, i.e. bisphenol A. The reactivity of the resins is usually described in terms of the so-called epoxy equivalent weight which is used to calculate the amount of hardener to be added. For epoxy resin types which are liquid at a temperature of 25° C., the epoxy equivalent weight generally has a value between 150–350, while solid epoxy resin types exhibit epoxy equivalent weights up to 4000.

Epoxy resins find particular application as insulating materials for which purpose they are widely used. A known disadvantage of epoxy resins is, however, that resin types having long periods of usefulness, i.e. having a slow rate of increase in viscosity—which is desirable to reduce waste and to increase the storage stability—also require very long hardening periods. Further, such epoxy resins do not satisfactorily bond with glass fibers and minerals, for example mica, so that the resistance to water of such bonded materials in many instances does not meet the requirements.

With a view to shortening the hardening time while preserving long periods of usefulness, it has previously been suggested in U.S. Pat. No. 3,316,215 to mix an anhydrous bisphenol-A-diglycidyl ether having an epoxy equivalent weight of between 150–500, with a sodium alcoholate in such a ratio that 0.015–0.15 part by weight of sodium are incorporated into 100 parts by weight of the anhydrous bisphenol-A-diglycidyl ether in the form of alcoholate. In this manner, a resin system is obtained whose reactivity increases very rapidly at high temperatures only, without the consistency of the resin at lower temperatures being affected.

The present invention is a development of the procedure taught in U.S. Pat. No. 3,316,215 and aims at providing an epoxy resin type which, in addition to being curable within relatively short periods, exhibits improved binding characteristics to glass fibers and minerals, thereby improving the resistance to water of the bonded products.

Briefly, and in accordance with the invention, it has been found that excellent results are obtained with alkali metal alcoholates in general, provided that in addition about 0.25–5 parts by weight of an epoxy alkylsilane ester is incorporated into the resin and that the reaction mixture thus obtained is degassed for at least one hour at temperatures ranging from between 40–70° C. and at pressures between 0.5–10 mm. Hg.

Experiments have demonstrated that the favorable results are obtained not only with sodium alcoholate but also with the other alkali metal alcoholates.

For hardening purposes, equivalent amounts of carboxylic acid anhydride hardener, calculated on the epoxy equivalent weight of the resin, are admixed with the resin system.

The epoxy resin type obtained in accordance with the inventive procedure is eminently suitably for insulation purposes, for example for the insulation of electrical machines and devices. It has thus been found that the resin is suitable for the impregnation of dried, wound and glass fiber reinforced mica fleece strips or corresponding foils.

The advantage of the invention is that a resin system is obtained whose reactivity increases very rapidly only at higher temperatures and that the water resistance is improved. This is clear from the accompanying drawing wherein the single figure represents graphs which reflect experiments carried out with the novel resin system. The abscissa of the coordinate system indicates in logarithmic scale the time in hours, while the ordinate depicts the dielectric resistance R of a test plate in MΩ. The test plate consisted of a cured multi-layer winding or insulator of glass fiber reinforced and epoxy resin impregnated mica fleece strips. The surface of the plates was made rough. In order to facilitate penetration of the water as quickly as possible, the winding or insulator plate was cut open on all sides. In the graphs, the time $t$ refers to the period of storage of the test plate in water. The function course $a$ corresponds to an epoxy resin without addition of an epoxy alkylsilane ester. In the resin corresponding to curve $b$, by contrast, an epoxy alkylsilane ester in the ratio 1:100 had been added. It is clear from the graph that the test plate devoid of the alkylsilane ester reaches an insulation or volume resistance of, for example, $R_1$ already after a time of about 15 minutes while in the test sample prepared according to the invention and under otherwise identical conditions, the numerical value of the insulation or volume resistance decreases to the value $R_1$ only after about 100 hours. The resistance was determined between two calibrated electrodes according to DIN 53482 in dependence on the storage time. It should also be emphasized that the advantage obtained is not accompanied by any disadvantageous phenomena as, for example, a decrease of desirable mechanical, thermal or dielectrical properties, but also these properties were, in fact, improved.

The invention will now be described by specific examples, it being understood, however, that the examples are given by way of illustration and not by way of limitation and that many changes may be effected without affecting in any way the scope and spirit of the invention as recited in the appended claims.

EXAMPLE I

The example was carried out with 100 parts by weight of bisphenol-A-diglycidyl ether having an epoxy equivalent weight between 150–500 and having incorporated therein 0.015–0.15 part by weight of sodium alcoholate pursuant to the teachings of U.S. Pat. No. 3,316,215. The sodium alcoholate enriched resin system was prepared according to the examples of said U.S. patent. 0.25–5 parts by weight of a γ-glycidoxypropyl-trimethoxy silane were added to the system and the mixture thus obtained was degassed for one hour at temperatures between 40–70° C. and at pressures between 0.5 to 10 mm. Hg.

EXAMPLE II 100 g. bisphenol-A-diglycidyl ether having an epoxy equivalent weight of 180 are stirred at 70° C. and 1 mm. Hg. After 4 hours, 0.15 g. of potassium were added to the resin under stirring and under the same conditions. As soon as the reaction is finished, 5 g. of beta-3,4-(epoxycyclohexyl)ethyl-trimethoxy-silane are admixed with the resin. The mixture thus obtained was degassed for one hour at temperatures between 40–70° C. and at a pressure of 1 mm. Hg.

While a specific embodiment of the invention has been shown and described in detail to illustrate the application of the inventive principles, it will be understood that the invention may be embodied otherwise without departing from such principles.

What is claimed is:

1. In a process of preparing a curable epoxy resin, the steps which comprise incorporating from 0.015–0.15 parts by weight of alkali metal in the form of alcoholate and 0.25–5 parts by weight of an epoxy alkylsilane ester into 100 parts by weight of an anhydrous bisphenol-A-diglydicyl ether having an epoxy equivalent weight of between 150–500, and subjecting the mixture thus obtained to degassing for a period of at least one hour at temperatures ranging between about 40–70° C. and at a pressure of between about 0.5–10 mm. Hg.

2. A process as claimed in claim 1, wherein the mixture is admixed with a substantially equivalent amount of carboxylic acid anhydride hardener, calculated on the epoxy equivalent weight of the resin, whereupon hardening of the resin is effected.

3. An epoxy resin suitable for the insulation of electrical equipment and dried, wound and glass fiber reinforced mica fleece strips and foils and curable by the addition of carboxylic acid anhydride as a hardener, said resin essentially consisting of anhydrous bisphenol-A-diglydicyl ether of an epoxy equivalent weight between about 150–500 and having incorporated therein from 0.015–0.15 part by weight of alkali metal in the form of alcoholate and 0.25–5 parts by weight of an epoxy alkyl silane ester.

4. An epoxy resin as claimed in claim 3, wherein the epoxy alkylsilane ester is γ-glycidoxypropyltrimethoxy silane or beta - 3,4-(epoxycyclohexyl)ethyltrimethoxysilane.

References Cited

UNITED STATES PATENTS

| | | | |
|---|---|---|---|
| 3,316,215 | 4/1967 | Muller | 260—47EpC |
| 3,388,079 | 6/1968 | Vandenberg | 260—2EpA |
| 3,413,391 | 11/1968 | Carroll et al. | 264—102 |

WILLIAM H. SHORT, Primary Examiner

T. E. PERTILLA, Assistant Examiner

U.S. Cl. X.R.

117—18, 161